United States Patent [19]
Fitts

[11] 3,883,627
[45] May 13, 1975

[54] MOLDING PROCESS FOR PRODUCING SUBSEQUENT ARTICLES FROM A MASTER

[75] Inventor: Martin Fitts, Portland, Oreg.

[73] Assignee: Cook Paint and Varnish Co., Kansas City, Mo.

[22] Filed: June 6, 1973

[21] Appl. No.: 367,361

[52] U.S. Cl. .............. 264/51; 106/38.2; 249/112; 249/134; 264/220; 264/DIG. 77
[51] Int. Cl. ...... B29c 1/02; B29c 17/04; B29c 7/00
[58] Field of Search ...... 249/112, 134; 264/51, 220; 106/38.2, 38.22

[56] References Cited
UNITED STATES PATENTS

| | | | |
|---|---|---|---|
| 3,248,758 | 5/1966 | Schmitz et al. | 249/134 |
| 3,301,926 | 1/1967 | Reiland | 249/134 |
| 3,596,316 | 8/1971 | Palermo | 249/112 |
| 3,615,071 | 10/1971 | Harper | 249/112 |
| 3,703,572 | 11/1972 | Bellasalma | 249/112 |
| 3,723,584 | 3/1973 | Nussbaum | 249/134 |

Primary Examiner—Ronald W. Griffin
Attorney, Agent, or Firm—Cushman, Darby & Cushman

[57] ABSTRACT

A molding process is provided for molding articles in the form of an original article or master by placing a heat curable elastomeric material which does not cause any inhibition between the master and the curable polymeric material, forming a polymeric material in situ as a foamed polymer backing having a density of at least two pounds per cubic foot to force the heat curable elastomeric material against the master, curing the heat curable elastomeric material, removing the cured polymer material and foamed polymer backing from the original master, and employing the cured elastomeric material and foam backing for molding subsequent articles in the shape of the master. The heat curable elastomeric material may be any heat curable material such as silicon gum rubber. The polymeric foam backing and the subsequently molded articles are preferably made of polyurethane.

6 Claims, No Drawings

MOLDING PROCESS FOR PRODUCING SUBSEQUENT ARTICLES FROM A MASTER

BACKGROUND OF THE INVENTION

The present invention relates to a mold and molding process for producing subsequent articles from a master, particularly furniture. As evidenced by U.S. Pat. Nos. 516,028 and 2,316,143 it is known to use unvulcanized rubber sheets to form a mold or pattern of a contour surface such as wood. It is also known to form padded articles having an outer rubber or vinyl skin with an inner foam cushion as explained in U.S. Pat. Nos. 2,955,972, 3,178,069 and 3,390,214. Finally, it is also known to mold parts from a silicone gum rubber which is vulcanizable by heat, as disclosed in U.S. Pat. No. 3,549,744.

Various methods have been employed for making polyurethane furniture by molding techniques in which the mold is formed directly from the article which is to be copied. The preferred process in widespread use today is disclosed in *Plastics Technology*, September 1968, pages 38–41. Liquid silicones are employed to form a three-dimensional mold from an article or master to be copied. These liquid silicones are generally poured over one-half of the three-dimensional article and then cured to form one-half of the mold and then the other half. Subsequent articles are foamed within the two halves of the molds to form polyurethane articles, especially decorative or furniture pieces.

One of the problems encountered with the liquid silicone molding technique is that it requires at least 24 hours before the liquid silicone is sufficiently catalyzed before it may be removed from the master, thus, cutting down the number of molds which may be produced in a given period of time. Furthermore, the liquid silicone material is poured over the master which is positioned in a frame thus requiring a very large amount of this silicone material to cover all of the raised portions of the article or master. This is a critical deficiency since the liquid silicone material generally sells for about $4.50 a pound. An additional problem is encountered in this method since the resulting silicone mold is only durable for about 100 cycles, that is, 100 molded articles.

It is the object of the present invention to overcome these disadvantages with prior art molding processes.

SUMMARY OF THE INVENTION

These disadvantages noted in the prior art are overcome by employing a heat curable elastomeric material as the medium for picking the details of the master. In this manner, a heat curable polymeric sheet material is placed over the master and forced against the master by a restricted foamed polymeric material which is foamed in situ. The heat curable elastomeric sheet material with the polymeric foamed backing is then cured by heating the material in any suitable manner. Since a heat curable polymeric sheet material is employed, the curing step only takes approximately one-half hour to 2 hours.

One advantage of the present invention result from the decreased amount of curable elastomeric sheet material which is employed in comparison with the liquid silicone method. The curable elastomeric sheet material costs only one-fourth to one-half the price of the liquid silicone materials and since it is in a sheet form, supported by a foamed polymeric material, less of the elastomeric material is required. The result is that it is possible to reduce the volume of material needed to pick up the master detail by as much as 80%. Further advantages exist in the present heat curable elastomeric sheet material molds which are cured in approximately 1 hour in comparison to the 24-hour period needed for liquid silicone molds, thus resulting in a greater number of molds produced for a given period of time and an increased production in the number of articles. Further advantages exist in the hardness of heat curable elastomeric sheet materials as compared to liquid silicone molds, thus resulting in a greater number of cycles per mold and, thus, a greater number of articles. Since the bulk of the mold in the present invention involves a foamed polymer backing, less mold framing is required, thus, reducing the cost of the articles significantly. An additional advantage exists in the more simple procedure of the present invention which does not involve deairing or catalyzing which are required in the liquid silicone molding techniques and which often result in short-lived molds due to the operator's error.

The preferred embodiment of the invention will now be explained in more detail; however, it is noted that the following steps are only preferred procedures and are not intended to limit the scope of the invention except as described in the claims. An original article or master which is to be copied is placed on a backing board within a frame. A suitable heat curable elastomeric sheet material is then placed over the master in order to sufficiently cover the entire master with a sufficient excess of the elastomeric sheet material completely surrounding the master. The thickness of the elastomeric sheet material varies depending on the amount of detail which is desired to be picked up from the master. Generally, the thickness of the elastomeric sheet material is about one-sixth inch to about one-half inch, the preferred thickness being one-eighth to one-third inch for articles such as furniture. The elastomeric sheet material may be any rubbery-type material which may be cured by heat. The composition of the material is not critical and need only be selected so that the elastomeric sheet material does not cause any inhibition between the master and the elastomeric material. By the term "inhibition" it is meant that there is no surface chemical reaction between the elastomeric material and the master which stops the curing of the elastomeric material or which produces any surface defects in the mold. The preferred elastomeric sheet materials are those which have been calendered with the necessary curing agent in the sheet stock and is thereafter activated and cured by heat alone, for example, urethane elastomeric gum stock or silicone gum stock. The preferred material is heat curing silicone gum rubbers which are generally made with polydimethyl siloxanes, fillers and other additives and curing agents. These materials are more specifically described in *Silicones* by Meals and Lewis, Reinhold Publishing Company, 1959, *Encyclopedia of Chemical Technology*, Volume 18, Kirk-Othmer published by John Wiley and Sons, Inc., 1969, and *Encyclopedia of Polymer Science and Technology*, Volume 12, published by John Wiley and Sons, Inc. 1970, which are hereby incorporated by reference. Some commercially available silicone gum rubbers are available from Dow-Corning Corporation as SILASTIC (Registered trademark of Dow-Corning) 4504U, 4505U, 4506U, 4507U and 4508U, having the following properties, as seen in Tables I and II.

CADOX is a trademark for a series of organic peroxide catalysts and VAROX is a trademark for a 50% active blend of 2,5 - bis (tert-butyl peroxy) - 2,5 - dimethylhexane with an inert mineral carrier.

The following Tables III and IV show the properties of silicone gum rubbers available from General Electric known as SE-436U, SE-456U and SE-476U.

In general, the heat curable elastomeric sheet material suitable for use in the present invention may be characterized in that they have a Shore A-durometer value greater than 25 in their cured condition.

TABLE I

| TYPICAL PROPERTIES* | 4504U | 4505U | Silastic 4506U | 4507U | 4508U |
|---|---|---|---|---|---|
| Cadox TS-50, parts/100 parts rubber by weight | 1.0 | 1.2 | 1.3 | 1.4 | 1.5 |
| Color | Off-white | | TO | | Light tan |
| Specific Gravity | 1.11 | 1.18 | 1.25 | 1.33 | 1.43 |
| Durometer, Shore A | 40 | 49 | 62 | 68 | 79 |
| Tensile Strength, psi | 1000 | 980 | 950 | 1000 | 950 |
| Elongation, % | 480 | 380 | 300 | 180 | 120 |
| Compression Set, % after 70 hrs at 150° C (302° F) | 23 | 21 | 21 | 23 | 25 |
| HEAT AGING, 70 hrs at 225° C (437° F) | | | | | |
| Durometer Change, points | −4 | −1 | +2 | +4 | +5 |
| Tensile Change, % | −12 | −10 | −8 | +1 | −5 |
| Elongation Change, % | +5 | −11 | −25 | −28 | −35 |
| OIL IMMERSION, ASTM NO. 1 OIL 70 hrs at 150° C (302° F) | | | | | |
| Durometer Change, points | −6 | −5 | −5 | −4 | −4 |
| Tensile Change, % | +4 | +6 | +7 | +7 | +9 |
| Elongation Change, % | +10 | +4 | 0 | −6 | −10 |
| Volume Change, % | +7 | +6 | +5 | +5 | +4 |

*Compounds catalyzed as indicated, then vulcanized in 0.075 inch thick ASTM slabs for 10 minutes at 116°C (240° F).

TABLE II

| TYPICAL PROPERTIES* | 4504U | 4505U | Silastic 4506U | 4507U | 4508U |
|---|---|---|---|---|---|
| Varox, parts/100 parts rubber by weight | 0.50 | 0.45 | 0.40 | 0.35 | 0.30 |
| Color | Off-white | | TO | | Light tan |
| Specific Gravity | 1.11 | 1.18 | 1.25 | 1.33 | 1.43 |
| Durometer, Shore A | 39 | 52 | 60 | 71 | 82 |
| Tensile Strength, psi | 980 | 1000 | 1020 | 1000 | 1100 |
| Elongation, % | 490 | 400 | 310 | 180 | 110 |
| Compression Set, % after 70 hrs at 150° C (302° F) | 15 | 15 | 15 | 18 | 20 |
| HEAT AGING 70 hrs at 225° C (437° F) | | | | | |
| Durometer Change, points | −6 | −3 | 0 | +1 | +3 |
| Tensile Change, % | −16 | −15 | −13 | −10 | −8 |
| Elongation Change, % | 0 | −9 | −19 | −29 | −35 |
| OIL IMMERSION, ASTM NO. 1 OIL 70 hrs at 150° C (302° F) | | | | | |
| Durometer Change, points | −5 | −4 | −3 | −3 | −1 |
| Tensile Change, % | +2 | +5 | +7 | +9 | +11 |
| Elongation Change, % | +2 | 0 | −3 | −7 | −10 |
| Volume Change, % | +7 | +5 | +5 | +4 | +4 |
| OTHER VULCANIZING AGENTS | | | | | |
| Type | Luperco AST** | | DiCup 40C** | | DiCup R** |
| Press Cure (minutes/°C (°F)) | 10/127(260) | | 10/150(302) | | 10/150(302) |
| Silastic 4504U | 0.5 | | 1.2 | | 0.5 |
| Silastic 4505U | 0.6 | | 1.4 | | 0.6 |
| Silastic 4506U | 0.7 | | 1.6 | | 0.7 |
| Silastic 4507U | 0.8 | | 1.8 | | 0.8 |
| Silastic 4508U | 0.9 | | 2.0 | | 0.9 |

*Compounds catalyzed as indicated, then vulcanized in 0.075 inch thick ASTM slabs for 10 minutes at 171°C (340° F).
**Parts/100 parts rubber by weight

TABLE III

| CURING AGENT | SE-436U | | SE-456U | | SE-476U | |
|---|---|---|---|---|---|---|
| (1) Bis(2,4 DiChlorobenzoyl) Peroxide 50% Active | 1.0 | | 1.2 | | 1.5 | |
| (2) 2,5 DiMethyl 2,5 Di(t-butyl) Peroxy) Hexanne 50% Active | | 0.8 | | 1.0 | | 0.8 |
| ASTM METHOD — Press Cure Conditions | 10 Min/250°F | 10 Min/350°F | 10 Min/250°F | 10 Min/350°F | 10 Min/250°F | 10 Min/350°F |
| Post Cure Conditions | 4 hrs/400°F | 4 hrs/400°F | 4 hrs/400°F | 4 hrs/400°F | 8 hrs/400°F | 8 hrs/400°F |
| TYPICAL PROPERTIES | | | | | | |
| D-767  Durometer, Shore "A" | 35±5 | 35±5 | 50±5 | 50±5 | 70±5 | 70±5 |
| D-412  Tensile Strength (psi) | 1100 | 1100 | 1300 | 1350 | 1200 | 1200 |
| D-412  Elongation (%) | 700 | 750 | 550 | 700 | 500 | 550 |
| D-624  Tear Resistance (#/in) | 170 | 170 | 200 | 200 | 200 | 200 |
| D-395  Compression Set (%) | | | | | | |
|   70 hrs @ 212°F | 15 | 13 | 16 | 17 | 17 | 17 |
|   70 hrs @ 300°F | 32 | 31 | 30 | 31 | 30 | 30 |
|   22 hrs @ 350°F | 33 | 32 | 30 | 32 | 30 | 30 |
| D-412  Tensile Stress Modulus | | | | | | |
|   @ 100% Elongation (psi) | 120 | 110 | 215 | 220 | 250 | 235 |
|   @ 200% Elongation (psi) | 210 | 195 | 485 | 475 | 550 | 500 |
|   @ 400% Elongation (psi) | 600 | 525 | 855 | 735 | 950 | 800 |
|   Bashore Resiliency | 50 | 48 | 50 | 50 | 47 | 45 |
| D-746  Brittle Point °F | -115 | -115 | -130 | -130 | -120 | -120 |
|   Linear Shrinkage | 3.0 | 4.0 | 3.0 | 4.0 | 3.0 | 4.0 |
|   Tear Propagation | | | | | | |
| D-813  Resistance Flex Cycles @ 75°F | 500,000 | 500,000 | 450,000 | 450,000 | 420,000 | 420,000 |
| HEAT AGING | 70 hrs @ 400°F | 24 hrs @ 437°F | 70 hrs @ 400°F | 24 hrs @ 437°F | 70 hrs @ 400°F | 24 hrs @ 437°F | 70 hrs @ 400°F | 24 hrs @ 437°F |
| Durometer Chg. (pts.) | +3 | +5 | +4 | +5 | +3 | +6 | +4 | +7 | +5 | +7 | +6 | +7 |
| Tensile Chg. (%) | -12 | -15 | -13 | -18 | -10 | -25 | -10 | -30 | -14 | -20 | -18 | -25 |
| Elongation Chg. (%) | -20 | -20 | -21 | -25 | -25 | -32 | -28 | -39 | -25 | -30 | -30 | -30 |
| Tear | NIL | -16 | NIL | -18 | -10 | -30 | -10 | -32 | -15 | -30 | -15 | -30 |
| OIL RESISTANCE 70 hrs/300°F | ASTM #1 | ASTM #3 | ASTM #1 | ASTM #3 | ASTM #1 | ASTM #3 | ASTM #1 | ASTM #3 | ASTM #1 | ASTM #3 | ASTM #1 | ASTM #3 |
| Durometer Chg. (pts.) | -4 | -20 | -5 | -21 | -8 | -30 | -8 | -30 | -4 | -25 | -4 | -25 |
| Tensile Chg. (%) | -28 | -60 | -29 | -62 | -25 | -50 | -27 | -50 | -15 | -45 | -18 | -45 |
| Elongation Chg. (%) | -30 | -55 | -30 | -56 | -25 | -50 | -26 | -50 | -17 | -43 | -18 | -45 |
| % Volume Chg. | +5 | +50 | +5 | +50 | +6 | +40 | +6 | +40 | +5.8 | +40 | +5.8 | +40 |
| FLUID RESISTANCE 70 hrs/158°F | SKYDROL 500A | SKYDROL 500A | SKYDROL 500A | SKYDROL 500A | SKYDROL 500A | SKYDROL 500A |
| Durometer Chg. (pts.) | -8 | -7 | -10 | -10 | -10 | -10 |
| Tensile Chg. (%) | -15 | -15 | -15 | -15 | -15 | -15 |
| Elongation Chg. (%) | -10 | -14 | -10 | -12 | -10 | -10 |
| % Volume Chg. | +9 | +9 | +9 | +9 | +7 | +7 |
| WATER RESISTANCE | 70 hrs/212°F | 70 hrs/212°F | 70 hrs/212°F | 70 hrs/212°F | 70 hrs/212°F | 70 hrs/212°F |
| Durometer Chg. (pts.) | +2 | +1 | +1 | +2 | +2 | +1 |
| Tensile Chg. (%) | NIL | NIL | NIL | NIL | NIL | -1 |
| Elongation Chg. (%) | NIL | -2 | NIL | NIL | -1 | -2 |
| % Volume Chg. | 1 | 1 | 1 | 1 | 1 | 1 |

TABLE IV

| PEROXIDE | COMMERCIAL GRADE | Parts Per 100 of SE-436U | Parts Per 100 of SE-456U | Parts Per 100 of SE-476U | Recommended Molding Temperature |
|---|---|---|---|---|---|
| Bis(2,4 DiChlorobenzoyl) Peroxide | Cadox TS-50(1) or Luperco CST(2) 50% Active Paste | 1.0 | 1.2 | 1.5 | 220°F/270°F |
| Benzoyl Peroxide | Cadox BSG-50(1) or Luperco AST(2) 50% Active Paste | 0.8 | 0.8 | 0.9 | 240°F/270°F |
| DiCumyl Peroxide | DiCup 40C(3) 40% Active Powder | 1.0 | 1.5 | 1.0 | 310°F/360°F |
| 2,5 DiMethyl -2,5 Di(t-butyl peroxy) Hexane | Varox(4) 50% Active Powder | 0.8 | 1.0 | 0.8 | 330°F/360°F |

If a master possesses sufficient detail, it is preferred to prepare a master for a vacuum drawing process which will assist the curable elastomeric sheet material in picking up the detail. The master is prepared in a known manner by drilling small holes in the deepest recesses of the master and placing the master and curable elastomeric sheet material on a vacuum table. If desirable, the master may be coated with a release agent to allow easy removal of the cured elastomeric sheet material later on. Once the elastomeric sheet material has been drawn up tight against the master by the vacuum drawing process, a frame is positioned over the master which completely encloses the master and the elastomeric sheet material. This frame must be strong enough to withstand polymeric foaming pressures in order to form the foamed polymeric backing material.

Next, a polymeric foamed material is formed in situ in order to drive the elastomeric sheet material up against the master thereby resulting in a complete copying of the detail of the master as compared to the prior art liquid silicone molding technique which often resulted in air bubbles due to the heavy viscosity of the liquid silicone. The type of polymer foam material which is used for the backing of the elastomeric sheet material is not important for the purposes of the present invention. The main purposes of the backing material are to drive the elastomeric sheet material up against the master to pick up all the detail and to act as a backing or support material for subsequent molding. In this manner, various polymeric foam systems may be employed such as polyurethane, polystyrene, expanded polyvinyl chloride, epoxy and phenolic foams. The polymeric foamed backing material should be a semi-rigid or rigid foam having a preferred free rise density of at least eight pounds per cubic foot, generally in the range of 2–60 lbs. per cubic foot. The preferred foamed polymeric backing material is polyurethane, having a preferred free rise density of at least 8 pounds per cubic foot, preferably packed (restricted) to 16–25 pounds per cubic foot. Once the foaming reaction is complete, generally less than 1 hour, the frame containing the master, the elastomeric sheet material, and the foamed polymeric backing material are treated so that the elastomeric sheet material is cured. Heat curable elastomeric sheet materials are preferred so that the whole frame may merely be placed in the oven at the minimum temperatures needed to cure the elastomeric material. The minimum temperature for curing is generally about 220° F and the time necessary for curing is approximately one-half hour to 2 hours. Silicone gum stock rubbers generally require a minimum temperature of about 250° and a curing time of about one-half hour to 2 hours, the preferred conditions being at least 350° F for about 1 hour. The heat cure of the elastomeric sheet material may be also accomplished by a foaming system which exotherms sufficiently to raise the temperature of the elastomeric sheet material to the minimum curing temperature, thereby avoiding the need for an additional source of heat such as an oven. Such exothermic systems are known, particularly in polyurethanes as more particularly described in the *Encyclopedia of Polymer Science and Technology*, Volume 11, 1969, published by John Wiley & Sons, Inc. which is hereby incorporated by reference.

The cured elastomeric sheet material with the foamed polymeric backing are then suitably framed for molding subsequent parts in the shape and form of the original article or master. The material which is poured or injection molded into the cured elastomeric sheet material mold may be any molding material which is generally employed for forming articles. For example, pieces of furniture are generally molded out of polystyrene or more preferably polyurethane. The preferred molding material is polyurethane, which is more particularly described in the above-cited volume 11 of *Encyclopedia of Polymer Science and Technology*. In order to sufficiently fill out the detail portions of the cured elastomeric sheet mold, the preferred polyurethane foaming systems must have a density in the range of 2–60 lbs. per cubic foot, preferably about 8–16 lbs. per cubic foot.

EXAMPLE

A drawer front is prepared with the above described invention by mounting a kiln-dry wood master such as ash, on a backing board surfaced with plastic laminates, such as formica. Holes 3/64th of an inch diameter are drilled in the deepest recesses of the master in order to prepare it for vacuum forming of the elastomeric sheet material. The master and the face of the backing board are then sprayed with a uniform coating of a release agent. Next, the master is mounted on a vacuum table over a vacuum port. A section of silicone gum rubber sheet large enough to cover the master and overlap about one inch all around the master is placed over it. The vacuum forming procedure is accomplished and the silicone gum rubber material is drawn against the master. This creates an even blanket of silicone gum rubber over the master with about a one-inch lip all around. A frame is then mounted on the backing board in order to contain the foamed polymeric backing materials. A sufficient amount of an 8 lb. per cubic foot free rise density water blown rigid urethane foam is poured into the restricted frame and foamed in situ in order to drive the silicone gum rubber sheet up against the master. The final density of the 8 lb. per cubic foot free rise density water blown rigid urethane foam will be packed (restricted) to the range of 20–25 lbs. per cubic foot because of the restricted volume of the foaming frame. The foaming reaction is completed in 15–30 minutes and is then placed in an oven at 350° F for 1 hour in order to cure the silicone gum rubber sheet. The cured silicone gum rubber mold is then removed from the oven and cooled. The cured silicone gum rubber mold may then be employed to form articles in the shape of the original drawer front with a polyurethane foam having a preferred free rise density in the range of 8–16 lbs. per cubic foot.

What is claimed is:
1. A molding process comprising:
   1. placing a heat curable elastomeric sheet material comprising curing agent and urethane elastomeric gum stock or silicone gum stock over a master which is to be copied, said heat curable elastomeric sheet material being one which does not cause inhibition between the master and the heat curable elastomeric sheet material;
   2. vacuum drawing the sheet material against the master;
   3. enclosing the master sheet material within a frame;
   4. then forming a foamed polymeric backing in situ to force the heat curable elastomeric sheet material against the master to copy the shape of the master in the heat curable elastomeric sheet material;
   5. curing the elastomeric sheet material in the shape of the master; and
   6. molding articles in the shape of the master in a mold constructed from the cured elastomeric sheet material.

2. A process according to claim 1, wherein the heat curable elastomeric sheet material is silicone gum rubber stock having a thickness of one-sixteenth to one-half inches.

3. A process according to claim 1, wherein the curing is carried out at a temperature of at least 250° F.

4. A process according to claim 1, wherein the curing is carried out by the exothermic reaction of the foamed polymeric backing.

5. A method according to claim 1, wherein the foamed polymeric backing is a polyurethane having a density in the range of 2–60 lbs. per cubic foot.

6. A method according to claim 1 wherein the molded articles are formed of polyurethane having a density in the range of 2–60 lbs. per cubic foot.

* * * * *